US012598529B2

(12) United States Patent
Inoue et al.

(10) Patent No.: US 12,598,529 B2
(45) Date of Patent: Apr. 7, 2026

(54) MOBILE COMMUNICATION SYSTEM, MOBILITY MANAGEMENT DEVICE, AND COMMUNICATION CONTROL METHOD FOR CONTROLLING CONNECTION BETWEEN MOBILE TERMINAL AND NETWORK

(71) Applicant: 1FINITY Inc., Kawasaki (JP)

(72) Inventors: Yoshio Inoue, Kawasaki (JP);
Hirotomo Yasuoka, Kawasaki (JP);
Masayuki Harada, Kawasaki (JP);
Takafumi Shono, Kawasaki (JP);
Kentaro Sawada, Kawasaki (JP);
Noboru Kobayashi, Tokorozawa (JP)

(73) Assignee: 1FINITY Inc., Kawasaki (JP)

( * ) Notice: Subject to any disclaimer, the term of this patent is extended or adjusted under 35 U.S.C. 154(b) by 309 days.

(21) Appl. No.: 18/235,390

(22) Filed: Aug. 18, 2023

(65) Prior Publication Data

US 2023/0397077 A1     Dec. 7, 2023

Related U.S. Application Data

(63) Continuation of application No. PCT/JP2021/012650, filed on Mar. 25, 2021.

(51) Int. Cl.
*H04W 36/30*         (2009.01)
*H04W 36/14*         (2009.01)

(52) U.S. Cl.
CPC .......... *H04W 36/30* (2013.01); *H04W 36/142* (2023.05)

(58) Field of Classification Search
CPC ..... H04W 8/04; H04W 88/06; H04W 36/322; H04W 36/0016; H04W 36/14; H04W 36/30; H04W 36/142
See application file for complete search history.

(56) References Cited

U.S. PATENT DOCUMENTS 9,998,908 B1 *   6/2018   Peden ..................... H04W 4/02
2014/0011498 A1   1/2014   Aono
(Continued)

FOREIGN PATENT DOCUMENTS

JP        2009-200631 A      9/2009
JP        2014-17676 A       1/2014
(Continued)

OTHER PUBLICATIONS

International Search Report of International Searching Authority issued by Japan Patent Office for International Patent Application No. PCT/JP2021/012650, mailed on May 25, 2021, with an English translation.

*Primary Examiner* — Allahyar Kasraian
(74) *Attorney, Agent, or Firm* — Myers Wolin, LLC

(57)               ABSTRACT

A mobile communication system includes a base station and a mobility management device and controls a connection between a mobile terminal and a plurality of networks. The mobility management device is connected to the base station and manages mobility of the mobile terminal in a cell of the base station. The mobility management device acquires, from the mobile terminal, network identification information that identifies a first network when the mobile terminal connects to the base station. The base station receives, from the mobile terminal, quality information that indicates communication quality between a base station of the first network identified by the network identification information and the mobile terminal. The mobility management device instructs the mobile terminal, based on the quality information, to connect to the first network identified by the network identification information.

8 Claims, 8 Drawing Sheets

(56) References Cited

U.S. PATENT DOCUMENTS

| | | | |
|---|---|---|---|
| 2014/0078912 A1* | 3/2014 | Park | H04J 11/005 |
| | | | 370/252 |
| 2014/0295837 A1* | 10/2014 | Madasamy | H04W 48/04 |
| | | | 455/435.1 |
| 2016/0345230 A1 | 11/2016 | Ramirez et al. | |
| 2022/0014977 A1* | 1/2022 | Otaka | H04W 28/0247 |

FOREIGN PATENT DOCUMENTS

| | | |
|---|---|---|
| JP | 2015-534356 A | 11/2015 |
| WO | 2014/043534 A2 | 3/2014 |
| WO | 2019/179925 A1 | 9/2019 |

* cited by examiner

| TERMINAL ID | PLMN NUMBER |
|---|---|
| xyz | 441-90-xxx3 |
| abc | 441-90-xxx1 |
| ⋮ | |

FIG. 5

| PRIORITY RANKING | PLMN NUMBER |
|---|---|
| 1 | 441-90-xxx2 |
| 2 | 441-90-xxx1 |
| ⋮ | |

⟵ VISITED NETWORK (VPLMN)

FIG. 6A

| PRIORITY RANKING | PLMN NUMBER |
|---|---|
| 1 | 441-90-xxx1 |
| 2 | 441-90-xxx2 |
| ⋮ | |

⟵ HOME NETWORK (HPLMN)

MOBILE COMMUNICATION SYSTEM, MOBILITY MANAGEMENT DEVICE, AND COMMUNICATION CONTROL METHOD FOR CONTROLLING CONNECTION BETWEEN MOBILE TERMINAL AND NETWORK

CROSS-REFERENCE TO RELATED APPLICATION

This application is a continuation application of International Application PCT/JP2021/012650 filed on Mar. 25, 2021, and designated the U.S., the entire contents of which are incorporated herein by reference.

FIELD

The embodiments discussed herein are related to a mobile communication system, a mobility management device, and a communication control method.

BACKGROUND

A mobile terminal is capable of communicating via the network of a telecommunications company with which the user of the mobile terminal is contracted. In the following description, this telecommunications company may be referred to as the "contracted telecommunications company". In addition, the network of the contracted telecommunications company may be referred to as the home network (alternatively, HPLMN: Home Public Land Mobile Network).

A mobile terminal may be capable of using, by means of roaming, a network of another telecommunications company that is affiliated with the contracted telecommunications company. In the following description, this network may be referred to as a visited network (alternatively, VPLMN: Visited Public Land Mobile Network).

For example, when the mobile terminal is located in a cell of the home network, the mobile terminal communicates via the home network. Further, when the mobile terminal moves from the cell area of the home network to the cell area of the visited network, the mobile terminal connects to the visited network by means of roaming. That is, cell switching is performed. Further, when the mobile terminal returns from the cell area of the visited network to the cell area of the home network, the mobile terminal re-connects to the home network.

Note that a method of switching from a cell belonging to the VPLMN to a cell belonging to the HPLMN is disclosed in Japanese Laid-Open Patent Publication No. 2014-017676 (Patent document 1), for example.

With the related technology, the time required to switch from a cell belonging to a visited network (that is, a VPLMN cell) to a cell belonging to a home network (that is, a HPLMN cell) is sometimes long. For example, in one of the related procedures, switching from a VPLMN cell to an HPLMN cell can be performed only in a cell switching period that is configured in a specified period. In this case, depending on the timing at which a trigger to switch from the VPLMN cell to the HPLMN cell occurs, it takes a long time from when the switching trigger occurs until the switching of the cell is actually completed.

Note that it may be possible to solve or mitigate this problem by using the method disclosed in the Patent document 1. However, the method disclosed in the Patent document 1 requires installation of dedicated software in a mobile terminal.

SUMMARY

According to an aspect of the embodiments, a mobile communication system includes a base station and a mobility management device and controls a connection between a mobile terminal and a plurality of networks. The mobility management device is connected to the base station and manages mobility of the mobile terminal in a cell of the base station. The mobility management device acquires, from the mobile terminal, network identification information that identifies a first network when the mobile terminal connects to the base station. The base station receives, from the mobile terminal, quality information that indicates communication quality between a base station of the first network identified by the network identification information and the mobile terminal. The mobility management device instructs the mobile terminal, based on the quality information, to connect to the first network identified by the network identification information.

The object and advantages of the disclosure will be realized and attained by means of the elements and combinations particularly pointed out in the claims.

It is to be understood that both the foregoing general description and the following detailed description are exemplary and explanatory and are not restrictive of the disclosure.

BRIEF DESCRIPTION OF DRAWINGS

FIG. 5 illustrates an example of a subscriber information storage;

FIGS. 6A and 6B illustrate an example of a PLMN list;

DESCRIPTION OF EMBODIMENTS

Figure 1:
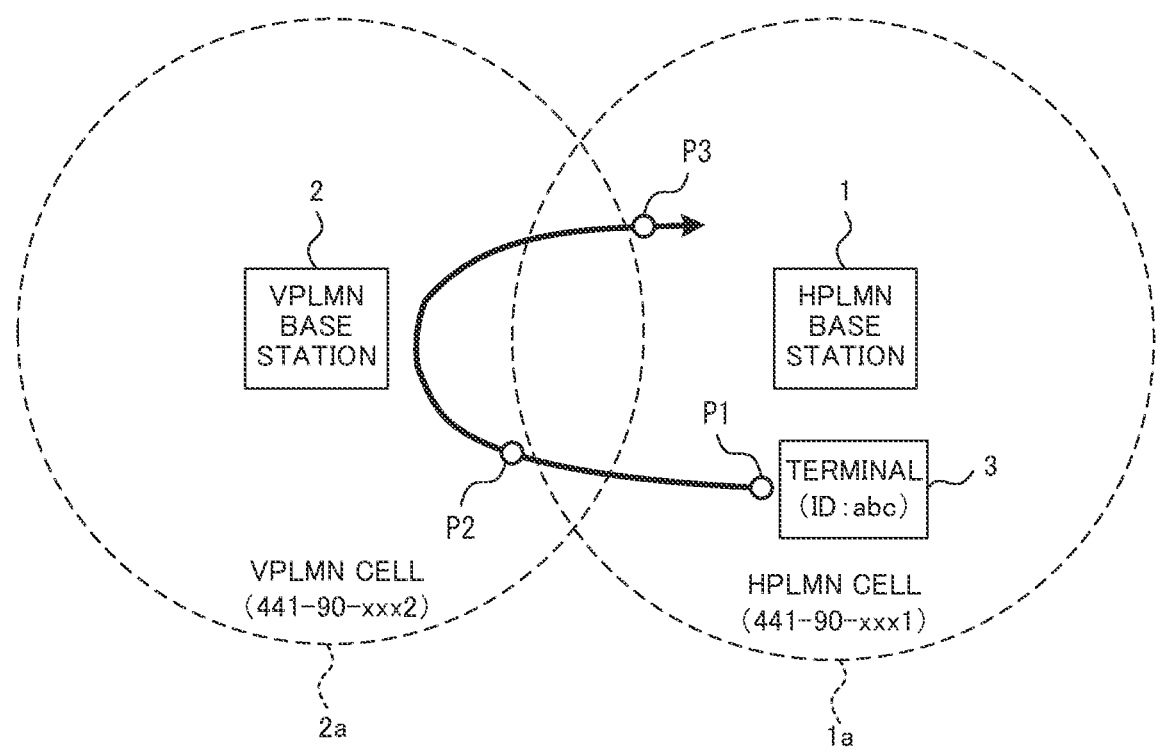
FIG. 1 illustrates an example of mobility of a mobile terminal according to an embodiment of the present disclosure.

FIG. 1 illustrates an example of mobility of a mobile terminal according to an embodiment of the present disclosure. In this example, an HPLMN base station 1 and a VPLMN base station 2 are installed adjacent to each other. Therefore, part of an HPLMN cell 1a formed by the HPLMN base station 1 and part of a VPLMN cell 2a formed by the VPLMN base station 2 overlap with each other. Note that the HPLMN cell 1a represents a communication area of the HPLMN base station 1, and the VPLMN cell 2a represents a communication area of the VPLMN base station 2.

Further, the HPLMN base station 1 and the VPLMN base station 2 may each be an eNB, for example.

Note that, in the following description, switching between a cell of a home network of a mobile terminal 3 and a cell of another network (that is, a visited network) will be described, but the present disclosure is not limited to or by this configuration. For example, in a case where a company other than a municipality or a telecommunications company has a private network, the present disclosure is also applicable to switching between cells of the private network.

A telecommunications company that operates the HPLMN base station 1 provides a telecommunications service to a user contracted with the telecommunications company. Further, the user of the mobile terminal 3 has a contract, with the telecommunications company, relating to the telecommunications service. Therefore, the mobile terminal 3 is capable of connecting to the network via the HPLMN base station 1. In the following description, this telecommunications company may be referred to as the "contracted telecommunications company". The network of the contracted telecommunications company may also be referred to as the home network (or HPLMN).

A telecommunications company that operates the VPLMN base station 2 is affiliated with a contracted telecommunications company to perform roaming. Therefore, the mobile terminal 3 is also capable of connecting to the network via the VPLMN base station 2. In the following description, this network may be referred to as the visited network (or the VPLMN).

The mobile terminal 3 will move along the curve illustrated in FIG. 1. In this case, the mobile terminal 3 connects to the HPLMN base station 1 when the mobile terminal 3 is located at a point P1. When the mobile terminal 3 moves from the point P1 to a point P2, the quality of the signal received from the HPLMN base station 1 becomes lower than a threshold level, and the quality of the signal received from the VPLMN base station 2 becomes higher than the threshold level. Thus, the mobile terminal 3 disconnects a link with the HPLMN base station 1 and connects to the VPLMN base station 2. That is, switching from the home network to the visited network is performed by means of roaming.

Thereafter, when the mobile terminal 3 moves from the point P2 to the point P3, the quality of the signal received from the HPLMN base station 1 becomes higher than the threshold level. Thus, the mobile terminal 3 disconnects a link with the VPLMN base station 2 and connects to the HPLMN base station 1. That is, switching from the visited network to the home network is performed.

Figure 2:
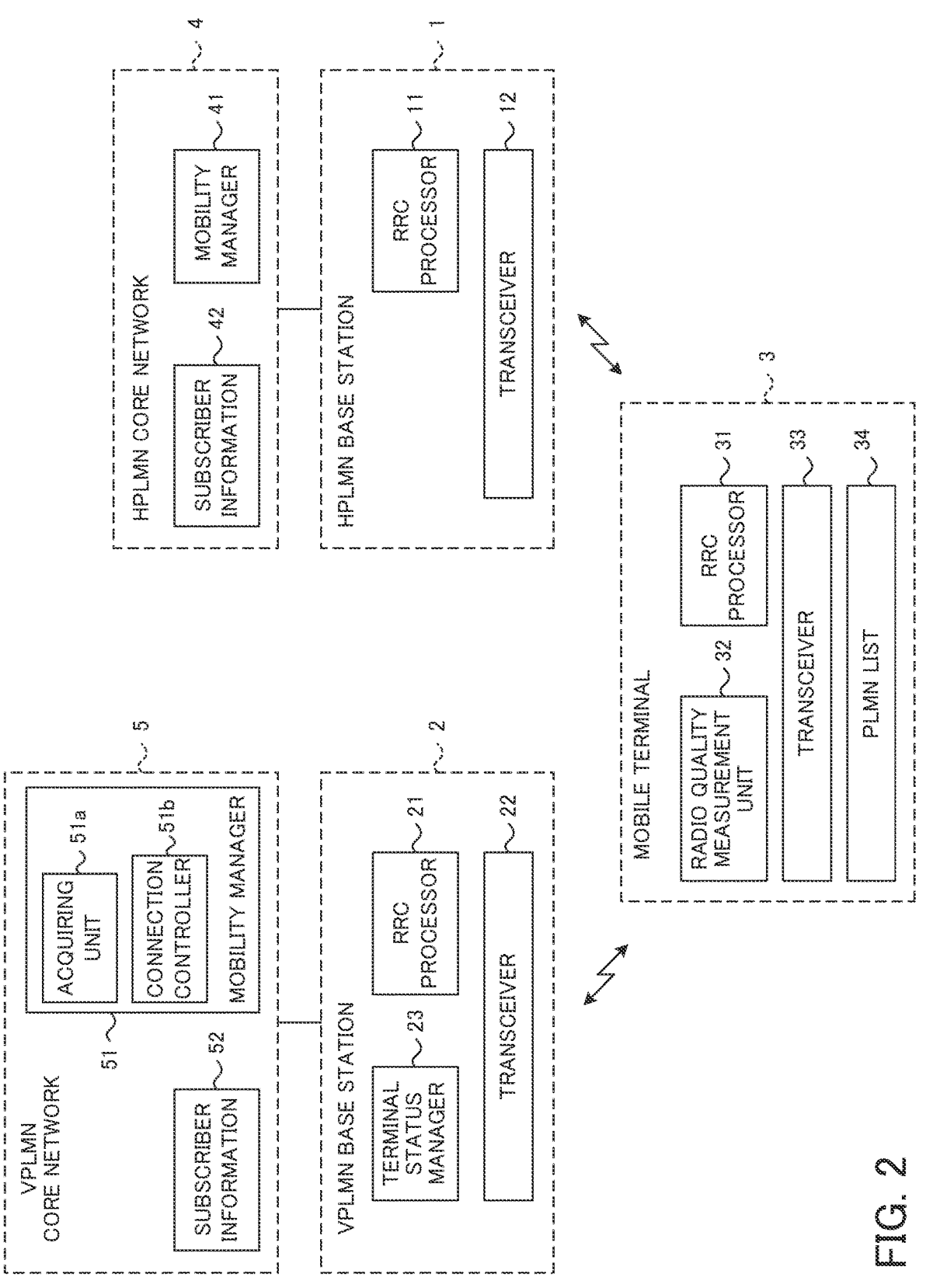
FIG. 2 illustrates an example of a mobile communication system according to the embodiment of the present disclosure.

FIG. 2 illustrates an example of a mobile communication system according to an embodiment of the present disclosure. In this example, a mobile communication system that provides the home network for the mobile terminal 3 includes the HPLMN base station 1 and an HPLMN core network 4. In addition, a mobile communication system that provides a visited network of the mobile terminal 3 includes the VPLMN base station 2 and a VPLMN core network 5.

The HPLMN base station 1 includes a radio resource control (RRC) processor 11 and a transceiver 12. The RRC processor 11 performs call control (including establishment of a connection) and RRC status management of a mobile terminal connecting to the HPLMN base station 1. In addition, the RRC processor 11 has a function that broadcasts information (frequency information, peripheral cell information, access control information, and the like) for the mobile terminal to connect to the HPLMN base station 1. The transceiver 12 includes a transmitter and a receiver. The transmitter transmits a radio signal to the mobile terminal. The receiver receives a radio signal transmitted from the mobile terminal.

The HPLMN core network 4 includes a mobility manager 41 and a subscriber information storage 42. The mobility manager 41 is a server computer that corresponds to a mobility management entity (MME) and that accommodates one or more base stations. The mobility manager 41 manages the mobility of a mobile terminal connected to a base station provided under the mobility manager 41. The subscriber information storage 42 stores subscriber information relating to mobile terminals contracted with the contracted telecommunications company. The subscriber information includes terminal IDs identifying the mobile terminals. The VPLMN base station 2 includes an RRC processor 21, a transceiver 22, and a terminal status manager 23. The functions of the RRC processor 21 and the transceiver 22 are substantially the same as those of the RRC processor 11 and the transceiver 12, respectively. The terminal status manager 23 manages the statuses of mobile terminals that connect to the VPLMN base station 2 by means of roaming.

The VPLMN core network 5 includes a mobility manager 51 and a subscriber information storage 52. The functions of the mobility manager 51 and the subscriber information storage 52 are substantially the same as those of the mobility manager 41 and the subscriber information storage 42, respectively. However, the mobility manager 51 is capable of managing the mobility of mobile terminals that connect to the VPLMN base station 2 by means of roaming. The subscriber information storage 52 also stores subscriber information relating to mobile terminals that connect to the VPLMN base station 2 by means of roaming.

The mobility manager 51 includes an acquiring unit 51*a* and a connection controller 51*b*. The acquiring unit 51*a* and the connection controller 51*b* will be described below.

The mobile terminal 3 includes an RRC processor 31, a radio quality measurement unit 32, a transceiver 33, and a PLMN list 34. The RRC processor 31 communicates with the RRC processor of the base station. Note that the RRC processor 31 may have a non-access stratum (NAS) function. The radio quality measurement unit 32 measures the quality of the radio signal transmitted from the base station. Here, the radio quality measurement unit 32 is capable of measuring the quality of a radio signal of a designated frequency which is transmitted from the base station of a designated network. The quality is represented by, for example, the power of a received signal. In this case, the radio quality measurement unit 32 measures the power of the received signal.

The transceiver 33 includes a transmitter and a receiver. The transmitter transmits a radio signal to the base station. The receiver receives a radio signal transmitted from the base station. A network to which the mobile terminal 3 can be connected is registered in the PLMN list 34. That is, one or more PLMNs to which the mobile terminal 3 can be connected are registered in the PLMN list 34. When selecting a network to be connected, the mobile terminal 3 preferentially selects a network registered in the PLMN list 34. When a plurality of networks are registered in the PLMN list 34, the mobile terminal 3 selects a network to which a high priority is assigned. Note that the PLMN list 34 corresponds to an EPLMN list in which an equivalent PLMN (EPLMN) is registered.

Figure 3:
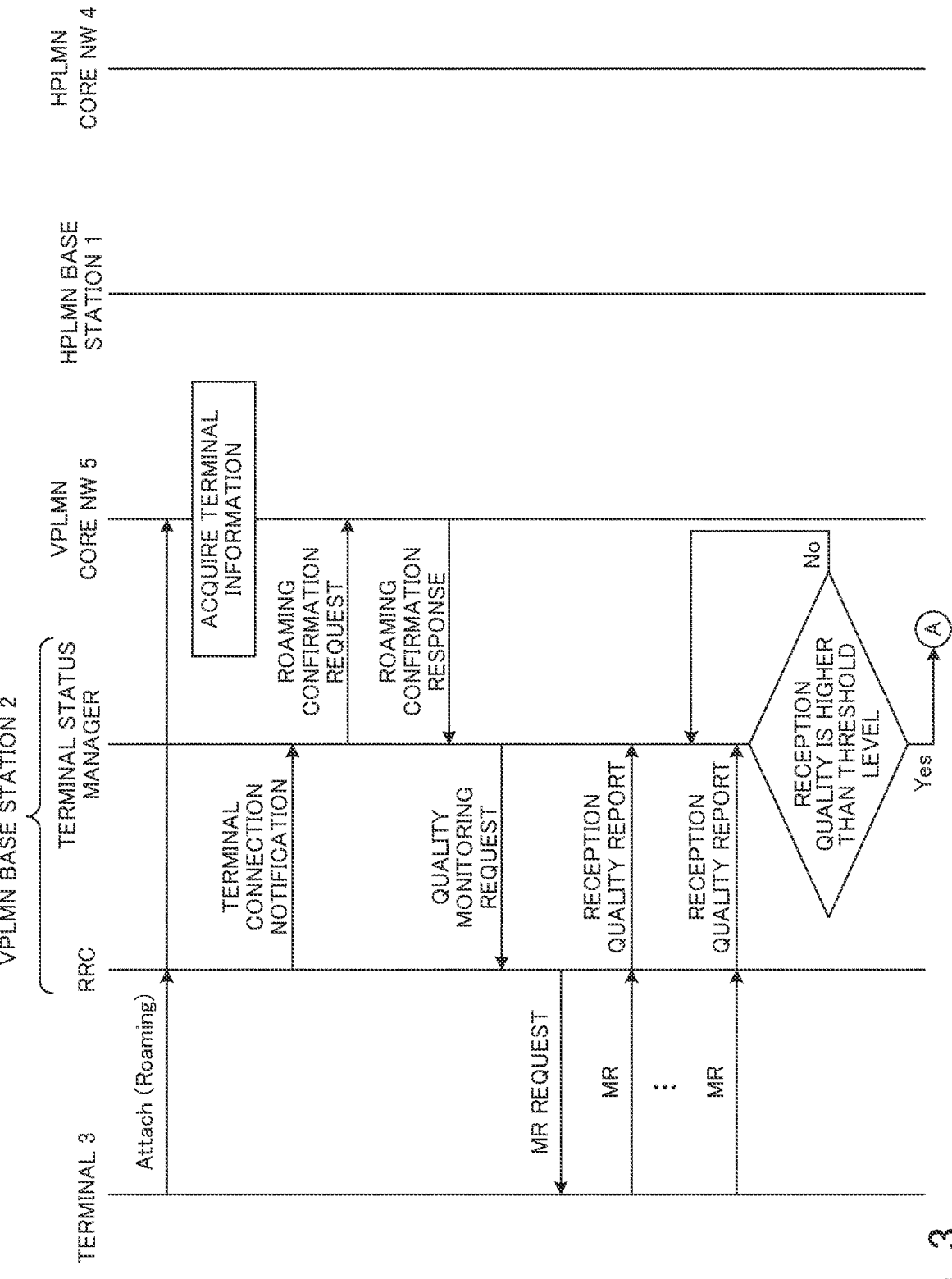
FIGS. 3 and 4 are sequence diagrams illustrating an example of switching from a visited network to a home network.
Figure 4:
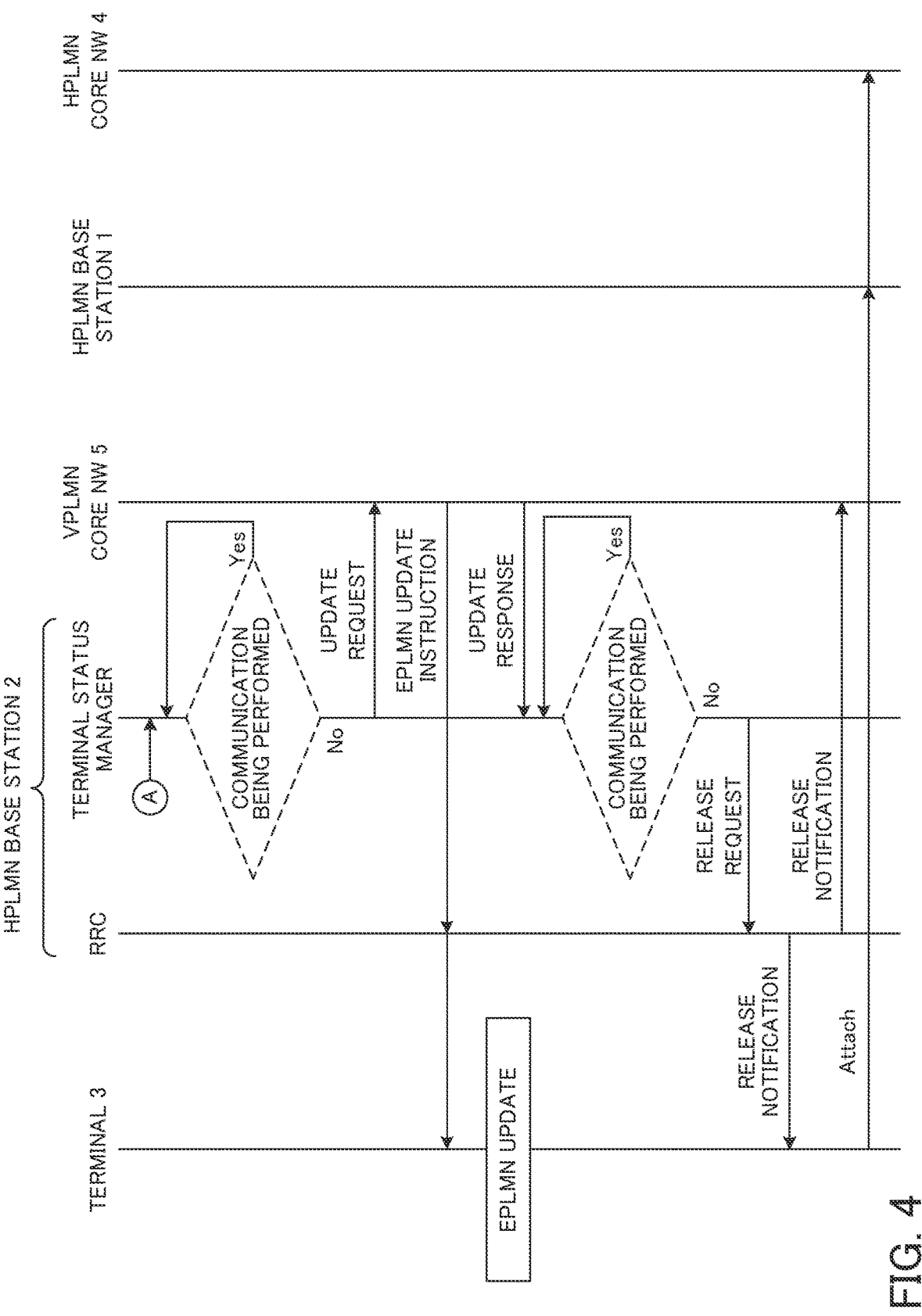

FIGS. 3 and 4 are sequence diagrams illustrating an example of switching from a visited network to a home network. In this example, as illustrated in FIG. 1, a PLMN number identifying the home network HPLMN is "441-90-xxx1", and a PLMN number identifying a visited network VPLMN is "441-90-xxx2". In addition, the terminal ID identifying the mobile terminal 3 is "abc". Further, the mobile terminal 3 is located in the cell of the HPLMN base station 1.

Thereafter, the mobile terminal 3 moves from the point P1 to the point P2 illustrated in FIG. 1. At this time, in the mobile terminal 3, the quality of the signal received from the HPLMN base station 1 becomes lower than the threshold level, and the quality of the signal received from the VPLMN base station 2 becomes higher than the threshold level. Thus, the mobile terminal 3 performs a procedure to connect to the visited network VPLMN. That is, the mobile terminal 3 establishes an RRC connection with the VPLMN base station 2. Further, the mobile terminal 3 transmits an Attach request to the VPLMN core network 5.

The Attach request includes a terminal ID that identifies the mobile terminal 3 and a PLMN number that identifies the home network HPLMN of the mobile terminal 3, and requests to connect to the visited network VPLMN. The Attach request is then forwarded to the mobility manager 51 of the VPLMN core network 5 via the VPLMN base station 2. Thus, the mobility manager 51 performs an authentication procedure of the mobile terminal 3 as necessary. At this time, the mobility manager 51 may request authentication to a home subscriber server (HSS) (not illustrated). In addition, the mobility manager 51 stores information relating to the mobile terminal 3 in the subscriber information storage 52. Specifically, the terminal ID of the mobile terminal 3 and the PLMN number representing the home network HPLMN of the mobile terminal 3 are stored in the subscriber information storage 52. Note that, in the following description, the PLMN number representing the home network HPLMN of the mobile terminal 3 may be referred to as the "home PLMN number".

FIG. 5 illustrates an example of the subscriber information storage 52. As described above, the subscriber information storage 52 stores information relating to mobile terminals that connect to the visited network VPLMN by means of roaming. Therefore, the terminal ID "abc" and the home PLMN number "441-90 xxx1" of the mobile terminal 3 are stored in the subscriber information storage 52. Note that the subscriber information storage 52 may store other information not illustrated in FIG. 5.

Note that a procedure for acquiring the terminal ID and the home PLMN number of the mobile terminal 3 is performed by the acquiring unit 51a illustrated in FIG. 2. That is, when the mobile terminal 3 connects to the VPLMN base station 2, the acquiring unit 51a acquires, from the mobile terminal 3, network identification information that identifies the home network of the mobile terminal 3.

When the mobile terminal 3 connects to the visited network VPLMN, the PLMN list 34 is updated in the mobile terminal 3. For example, as illustrated in FIG. 6A, the network in which the mobile terminal 3 is located (that is, the visited network VPLMN) is registered in the PLMN list 34 as the network with the highest priority.

Furthermore, when the mobile terminal 3 connects to the visited network VPLMN, the RRC processor 21 of the VPLMN base station 2 transmits a terminal connection notification to the terminal status manager 23. The terminal connection notification includes a terminal ID for identifying the mobile terminal 3. Thus, the terminal status manager 23 transmits a roaming confirmation request to the VPLMN core network 5. This roaming confirmation request indicates that the mobile terminal 3 has connected to the visited network VPLMN by means of roaming. Therefore, the roaming confirmation request includes a terminal ID identifying the mobile terminal 3.

Upon receiving the roaming confirmation request from the VPLMN base station 2, the mobility manager 51 of the VPLMN core network 5 checks that the mobile terminal 3 has roamed to the visited network VPLMN by referring to the subscriber information storage 52. At this time, the PLMN number (that is, the home PLMN number of the mobile terminal 3) stored in association with the terminal ID of the mobile terminal 3 is extracted from the subscriber information storage 52. In the example illustrated in FIG. 5, the PLMN number "441-90-xxx1" is extracted based on the terminal ID "abc". Thereafter, the mobility manager 51 transmits a roaming confirmation response corresponding to the received roaming confirmation request to the VPLMN base station 2. The roaming confirmation response includes the terminal ID and the home PLMN number of the mobile terminal 3. That is, the terminal status manager 23 is capable of acquiring the terminal ID and the home PLMN number of the mobile terminal 3.

Upon receiving the roaming confirmation response, the terminal status manager 23 sends a quality monitoring request to the RRC processor 21. The quality monitoring request includes the terminal ID and the home PLMN number of the mobile terminal 3, and requests measurement of communication quality between the mobile terminal 3 and the network which is identified by the home PLMN number.

Upon receiving the quality monitoring request, the RRC processor 21 transmits a measurement report (MR) request to the mobile terminal 3. The measurement report request requests measurement of the communication quality between the mobile terminal 3 and the network identified by the PLMN number included in the quality monitoring request (that is, the PLMN number included in the roaming confirmation response). In this example, the PLMN number represents the home network HPLMN. Note that the measurement report request may designate a frequency at which the communication quality should be measured.

The mobile terminal 3 creates a measurement report in response to the measurement report request received from the VPLMN base station 2. That is, the mobile terminal 3 measures the quality of the communication with the network designated by the measurement report request. In this example, the measurement report request includes the PLMN number representing the home network HPLMN. In this case, the mobile terminal 3 measures the power of the radio signal transmitted from the HPLMN base station 1. At this time, the mobile terminal 3 may measure received power of a reference signal for which the transmit power is known. Alternatively, the mobile terminal 3 may measure the total power of the signal transmitted from the HPLMN base station 1. Note that the mobile terminal 3 periodically measures the power of the received signal. The mobile terminal 3 then transmits a measurement report indicating the measurement result to the VPLMN base station 2.

Note that, when the frequency used by the mobile terminal 3 is preconfigured, the mobile terminal 3 measures the quality of that frequency. When the measurement report request designates a frequency, the mobile terminal 3 measures the quality of the designated frequency.

In the VPLMN base station 2, the measurement report is forwarded to the terminal status manager 23 as a reception quality report. Here, the reception quality report indicates the quality (for example, the power) of a signal received by the mobile terminal 3 from the HPLMN base station 1. Further, the terminal status manager 23 compares the reception quality with a specified threshold level. The threshold level is used, for example, to determine whether the mobile terminal 3 is capable of communicating, with favorable quality, with the base station. Therefore, when the reception quality is higher than the threshold level, the terminal status manager 23 determines that the mobile terminal 3 is capable of communicating, with favorable quality, with the HPLMN base station 1. That is, when the reception quality is higher than the threshold level, the terminal status manager 23 determines that the mobile terminal 3 is located in the cell of the home network HPLMN (alternatively, the mobile terminal 3 has moved from the cell of the visited network VPLMN to the cell of the home network HPLMN).

Note that, when the reception quality is lower than the threshold level, the terminal status manager 23 determines that the mobile terminal 3 is not located in the cell of the home network HPLMN. In this case, the VPLMN base station 2 waits for the next measurement report.

When the reception quality becomes higher than the threshold level, the terminal status manager 23 transmits an update request to the VPLMN core network 5. This update request indicates that the mobile terminal 3 has moved into the cell of the home network HPLMN. In the VPLMN core network 5, the mobility manager 51 creates an EPLMN update instruction based on the update request. Here, this update request indicates that the mobile terminal 3 has moved to the cell of the home network HPLMN. Therefore, the EPLMN update instruction instructs that the value of the EPLMN of the mobile terminal 3 be updated to a value representing the home network HPLMN. That is, the EPLMN update instruction instructs that the PLMN number representing the home network HPLMN be recorded as the network with the highest priority in the PLMN list 34 of the mobile terminal 3. The mobility manager 51 then transmits an EPLMN update instruction to the mobile terminal 3.

Note that the procedure to create and transmit the EPLMN update instruction to the mobile terminal 3 is performed by the connection controller 51b illustrated in FIG. 2. That is, when the communication quality between the mobile terminal 3 and the home network HPLMN becomes higher than a specified threshold level, the connection controller 51b issues an instruction to the mobile terminal 3 that the mobile terminal 3 should preferentially connect to the home network HPLMN.

Upon receiving the EPLMN update instruction via the VPLMN base station 2, the mobile terminal 3 updates the PLMN list 34. In this example, as illustrated in FIG. 6B, the PLMN number representing the home network HPLMN is recorded as the network with the highest priority in the PLMN list 34.

Furthermore, in the VPLMN core network 5, the mobility manager 51 transmits an update response corresponding to the update request to the VPLMN base station 2. Thus, the terminal status manager 23 creates a release request according to the update response and sends the release request to the RRC processor 21.

Upon receiving the release request, the RRC processor 21 releases resources for communication between the mobile terminal 3 and the VPLMN base station 2. The RRC processor 21 then transmits a release notification to the mobile terminal 3. The release notification indicates that a resource for communication between the mobile terminal 3 and the VPLMN base station 2 is released due to "redirect". Therefore, upon receiving the release notification, the mobile terminal 3 releases the resources for connecting to the visited network VPLMN. The RRC processor 21 also transmits a release notification to the VPLMN core network

5. Thus, the mobility manager 51 records, in the subscriber information storage 52, that the mobile terminal 3 has moved away from the visited network VPLMN.

The mobile terminal 3 starts a procedure to connect to a new network. At this time, the mobile terminal 3 attempts connections, among the networks registered in the PLMN list 34, in order starting with the network with the highest priority. In this example, the PLMN list 34 is updated to the state illustrated in FIG. 6B by the above-described EPLMN update instruction. Therefore, in this case, the mobile terminal 3 attempts to connect to the home network HPLMN. Specifically, the mobile terminal 3 sends an Attach request to the HPLMN base station 1. The Attach request is then forwarded to the mobility manager 41 of the HPLMN core network 4. As a result, the mobile terminal 3 is capable of connecting to the home network HPLMN.

As described above, in the procedure according to the embodiment of the present disclosure, when the mobile terminal 3 is connected to the visited network, the mobile terminal 3 measures the quality of the signal received from the base station of the home network, based on an instruction (the measurement report request in FIG. 3) transmitted from the visited network. When the reception quality is higher than the threshold level, the core network of the visited network (in FIG. 2, the mobility manager 51) transmits, to the mobile terminal 3, information (in FIG. 4, an EPLMN update instruction) designating a network to which the mobile terminal 3 should preferentially connect. The mobile terminal 3 then connects to a network designated from the core network of the visited network. That is, the mobile communication system is capable of controlling switching of the connection from the visited network to the home network based on the radio status of the mobile terminal 3.

In this case, when the mobile terminal 3 connected to the visited network moves into the cell of the home network, the procedure illustrated in FIG. 4 is performed immediately, and the mobile terminal 3 connects to the home network. Therefore, the time required for switching from the cell of the visited network to the cell of the home network is short.

Figure 7:
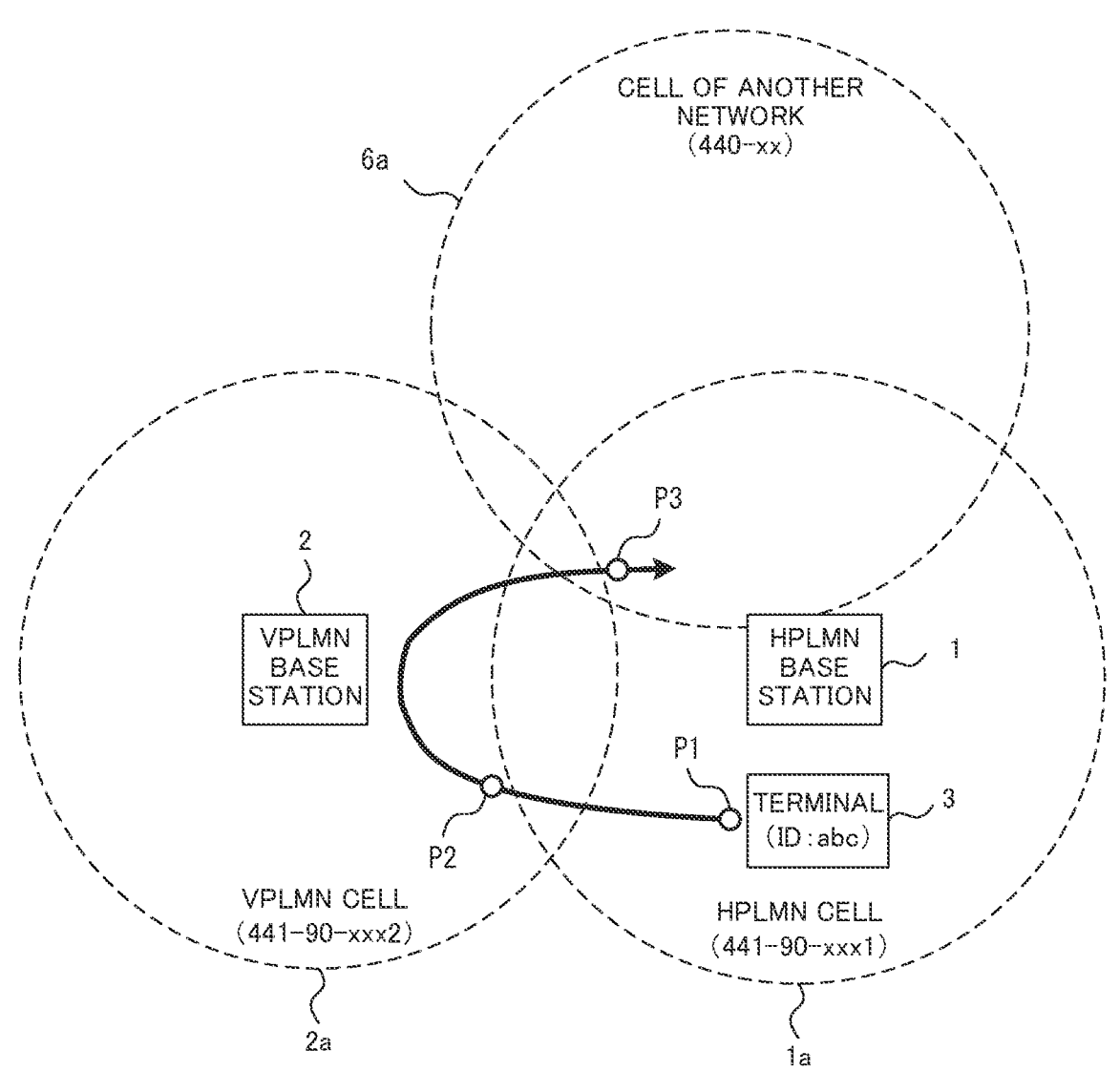
FIG. 7 illustrates another example of mobility of the mobile terminal.

In addition, the EPLMN (that is, the PLMN list 34) of the mobile terminal 3 is updated by the EPLMN update instruction transmitted from the mobility manager 51 of the visited network. Therefore, when the mobile terminal 3 has moved from the cell of the visited network to the cell of the home network, the mobile terminal 3 is capable of reliably re-connecting to the home network. In the example illustrated in FIG. 7, when the mobile terminal 3 moves from the point P2 to the point P3, the mobile terminal 3 is located in both the HPLMN cell 1a belonging to the home network and a cell 6a belonging to another network. However, a home network HPLMN is registered in the PLMN list 34 of the mobile terminal 3. Therefore, even in such a case, the mobile terminal 3 is capable of reliably re-connecting to the home network.

Note that, in the foregoing example, when the communication quality becomes higher than the threshold level, cell switching is immediately performed, but the present disclosure is not limited to this procedure. For example, when the communication quality becomes higher than the threshold level, the VPLMN base station 2 may check whether data communication is continuous between the mobile terminal 3 and the VPLMN base station 2, as illustrated in FIG. 4.

In this case, when data communication is continuous between the mobile terminal 3 and the VPLMN base station 2, the VPLMN base station 2 does not transmit an update request to the VPLMN core network 5. Then, when the data communication between the mobile terminal 3 and the VPLMN base station 2 ends, the VPLMN base station 2 transmits an update request to the VPLMN core network 5. That is, cell switching is performed after the data communication between the mobile terminal 3 and the VPLMN base station 2 ends. According to this procedure, data communication is less likely to be interrupted.

Alternatively, when data communication continues between the mobile terminal 3 and the VPLMN base station 2, the VPLMN base station 2 does not transmit a release request to the mobile terminal 3. Then, when the data communication between the mobile terminal 3 and the VPLMN base station 2 ends, the VPLMN base station 2 transmits a release request to the mobile terminal 3. Also in this case, cell switching is performed after the data communication between the mobile terminal 3 and the VPLMN base station 2 ends.

In addition, in the foregoing example, after disconnecting communication between the mobile terminal 3 and the visited network VPLMN, the mobile terminal 3 connects to the home network HPLMN, but the present disclosure is not limited to this procedure. That is, after the mobile terminal 3 connects to the home network HPLMN, communication between the mobile terminal 3 and the visited network VPLMN may be disconnected.

Furthermore, in the foregoing example, when the mobile terminal 3 connects to the VPLMN base station 2, the mobility manager 51 acquires, from the mobile terminal 3, network identification information that identifies the home network of the mobile terminal 3, but the present disclosure is not limited to this procedure. For example, a specific network to which the mobile terminal 3 connects under a specified condition is determined in advance, and information that identifies the specific network is stored in the VPLMN base station 2 or the VPLMN core network 5 in association with home network information of the mobile terminal 3. In this case, the VPLMN base station 2 detects the specific network from the home network information of the mobile terminal 3. The VPLMN base station 2 then instructs the mobile terminal 3 to measure the communication quality of the detected specific network by using a measurement report request.

Alternatively, for example, a specific network to which the mobile terminal 3 connects under a specified condition is determined in advance, and network identification information that identifies the specific network is recorded in a specified memory area of the mobile terminal 3. The mobile terminal 3 also transmits network identification information that identifies the specific network to the mobility manager 51 together with the Attach request. In this case, when the communication quality between the base station of the specific network and the mobile terminal 3 becomes higher than a specified threshold level, the mobility manager 51 instructs the mobile terminal 3 to preferentially connect to the specific network.

Further, in a case where a plurality of subnetworks (for example, sXGP and BWA) with different systems are mixed in a private network, the present disclosure can also be applied to switching between a cell of one subnetwork and a cell of another subnetwork.

Furthermore, in the foregoing example, switching is performed from the visited network VPLMN to the home network HPLMN, but the present disclosure is not limited to this procedure. That is, the mobile communication system may perform switching from the visited network VPLMN to a desired network. However, the network to be connected to is preferably registered in the mobility manager 51 of the VPLMN core network 5.

In this case, for example, the mobility manager 51 designates the network to which the mobile terminal 3 should connect in the roaming confirmation response illustrated in FIG. 3. The VPLMN base station 2 notifies the mobile terminal 3 of the designated network. The mobile terminal 3 then measures the communication quality of the designated network. In addition, the mobility manager 51 notifies the mobile terminal 3 of the network to be connected to, in the EPLMN update instruction illustrated in FIG. 3.

Figure 8A:
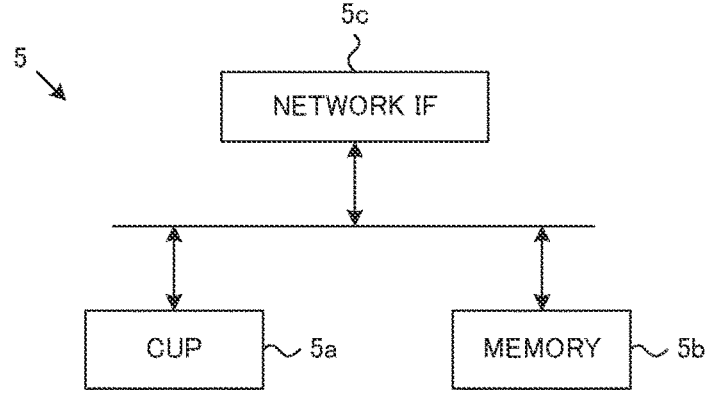
FIG. 8A illustrates an example of a hardware configuration of a core network.

FIG. 8A illustrates an example of a hardware configuration of the VPLMN core network 5. The VPLMN core network 5 includes a CPU 5a, a memory 5b, and a network IF 5c. The CPU 5a provides the functions of the mobility manager 51 (including the acquiring unit 51a and the connection controller 51b) by executing a program stored in the memory 5b. The CPU is also capable of providing other functions. The memory 5b stores a program which is executed by the CPU 5a. The memory 5b is also used as a work area of the CPU 5a. The subscriber information storage 52 may also be realized using the memory 5b. The network IF 5c provides an interface with the VPLMN base station 2. Furthermore, the network IF 5c may provide an interface with another device.

Figure 8B:
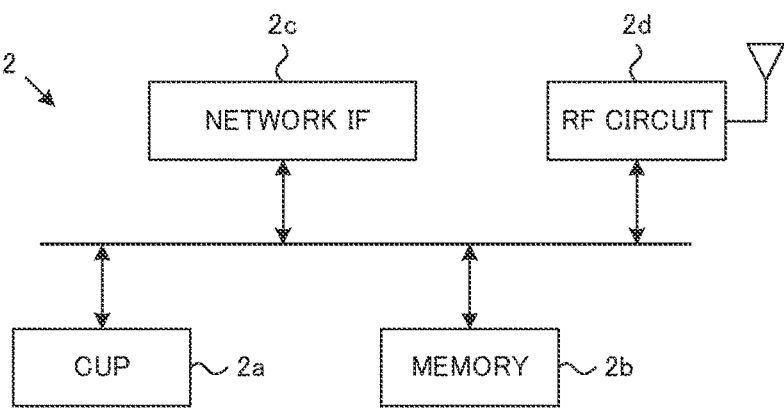
FIG. 8B illustrates an example of a hardware configuration of a base station.

FIG. 8B illustrates an example of a hardware configuration of the VPLMN base station 2. The VPLMN base station 2 includes a CPU 2a, a memory 2b, a network IF 2c, and an RF circuit 2d. The CPU 2a provides the functions of the RRC processor 21 and the terminal status manager 23 by executing a program stored in the memory 2b. The CPU 2a is also capable of providing other functions of the base station. The memory 2b stores a program which is executed by the CPU 2a. The memory 2b is also used as a work area of the CPU 2a. The network IF 2c provides an interface with the VPLMN core network 5. Furthermore, the network IF 2c may provide an interface with another device. The RF circuit 2d corresponds to the transceiver 22 illustrated in FIG. 2 and includes a radio transmitter and a radio receiver.

Figure 8C:
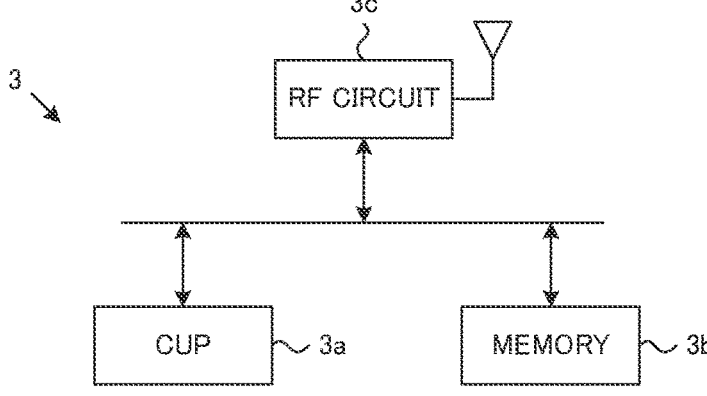
FIG. 8C illustrates an example of a hardware configuration of the mobile terminal.

FIG. 8C illustrates an example of a hardware configuration of the mobile terminal 3. The mobile terminal 3 includes a CPU 3a, a memory 3b, and an RF circuit 3c. The CPU 3a provides the functions of the RRC processor 31 and the radio quality measurement unit 32 by executing a program stored in the memory 3b. The CPU 3a is also capable of providing other functions of the mobile terminal 3. The memory 3b stores a program which is executed by the CPU 3a. The memory 3b is also used as a work area of the CPU 3a. Further, the PLMN list 34 may be realized using the memory 3b. The RF circuit 3c corresponds to the transceiver 33 illustrated in FIG. 2 and includes a radio transmitter and a radio receiver.

Note that the configuration of the HPLMN core network 4 is substantially the same as that of the VPLMN core network 5. Furthermore, the configuration of the HPLMN base station 1 is substantially the same as that of the VPLMN base station 2.

All examples and conditional language provided herein are intended for the pedagogical purposes of aiding the reader in understanding the disclosure and the concepts contributed by the inventor to further the art, and are not to be construed as limitations to such specifically recited examples and conditions, nor does the organization of such examples in the specification relate to a showing of the superiority and inferiority of the disclosure. Although one or more embodiments of the present disclosure have been described in detail, it should be understood that the various changes, substitutions, and alterations could be made hereto without departing from the spirit and scope of the disclosure.

What is claimed is:

1. A mobile communication system that controls a connection between a mobile terminal and a plurality of networks, the mobile communication system comprising:

a base station; and a mobility management device configured to be connected to the base station and manage mobility of the mobile terminal in a cell of the base station, wherein the mobility management device acquires, from the mobile terminal, network identification information that identifies a first network when the mobile terminal connects to the base station, the base station receives, from the mobile terminal, quality information that indicates communication quality between a base station of the first network identified by the network identification information and the mobile terminal, and the mobility management device;

receives the quality information from the base station; and instructs the mobile terminal, based on the quality information, to connect to the first network identified by the network identification information, when the communication quality is higher than a specified threshold level and data communication is not being performed between the mobile terminal and the base station, the mobility management device instructs the mobile terminal to connect to the first network.

2. The mobile communication system according to claim 1, wherein the base station transmits a request to the mobile terminal to measure communication quality between the base station of the first network and the mobile terminal, and the base station receives the quality information transmitted from the mobile terminal in response to the request.

3. The mobile communication system according to claim 1, wherein, when the communication quality between the base station of the first network and the mobile terminal becomes higher than the specified threshold level, the mobility management device instructs the mobile terminal to connect to the first network.

4. The mobile communication system according to claim 1, wherein the quality information is a measurement report indicating received power of a signal transmitted from the base station of the first network.

5. The mobile communication system according to claim 1, wherein the mobile terminal includes a list in which networks to be preferentially connected are registered, and the mobility management device updates the list such that the mobile terminal is preferentially connected to the first network.

6. The mobile communication system according to claim 1, wherein the first network is a home network of the mobile terminal.

7. A mobility management device that manages mobility of a mobile terminal in a cell of a base station of a visited network in a mobile communication system that controls a connection between the mobile terminal and a plurality of networks, the mobility management device comprising:

processor circuitry configured to acquire, from the mobile terminal, network identification information that identifies a first network, when the mobile terminal connects to the base station, and instruct the mobile terminal to connect to the first network based on communication quality between a base station of the first network identified by the network identification information and the mobile terminal, when the communication quality is higher than a specified threshold level and data communication is not being performed between the mobile terminal and the base station, the mobility management device instructs the mobile terminal to connect to the first network.

8. A communication control method for controlling a connection between a mobile terminal and a network, comprising:

by a mobility management device, acquiring, from the mobile terminal, network identification information that identifies a first network, when the mobile terminal connects to a base station of a visited network, by the base station, receiving, from the mobile terminal, quality information that indicates communication quality between a base station of the first network and the mobile terminal, and by the mobility management device, receiving the quality information from the base station; and instructing the mobile terminal, based on the communication quality, to connect to the first network identified by the network identification information, when the communication quality is higher than a specified threshold level and data communication is not being performed between the mobile terminal and the base station, the mobility management device instructs the mobile terminal to connect to the first network.

* * * * *